United States Patent
Tsumura et al.

(10) Patent No.: US 9,787,246 B2
(45) Date of Patent: Oct. 10, 2017

(54) MOTOR DRIVE CONTROL DEVICE, COMPRESSOR, AIR-SENDING DEVICE, AND AIR-CONDITIONING APPARATUS

(71) Applicant: Mitsubishi Electric Corporation, Tokyo (JP)

(72) Inventors: Akihiro Tsumura, Tokyo (JP); Shinsaku Kusube, Tokyo (JP); Kenta Yuasa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/102,624

(22) PCT Filed: Mar. 15, 2014

(86) PCT No.: PCT/JP2014/057015
§ 371 (c)(1),
(2) Date: Jun. 8, 2016

(87) PCT Pub. No.: WO2015/140867
PCT Pub. Date: Sep. 24, 2015

(65) Prior Publication Data
US 2016/0380575 A1    Dec. 29, 2016

(51) Int. Cl.
*H02P 1/24*    (2006.01)
*H02P 29/50*    (2016.01)
(Continued)

(52) U.S. Cl.
CPC ............ *H02P 29/50* (2016.02); *F25B 49/022* (2013.01); *F25B 49/025* (2013.01); *H02M 1/14* (2013.01);
(Continued)

(58) Field of Classification Search
CPC ........ G05D 3/1418; G05D 3/121; G05B 5/01; H02P 21/06; H02P 23/08; H02P 2207/01; H02P 21/085
(Continued)

(56) References Cited

U.S. PATENT DOCUMENTS 5,303,140 A * 4/1994 Shimizu ................ H02M 5/458
315/190
6,958,589 B2 * 10/2005 Kawaji ................. H02P 27/045
318/438
(Continued)

FOREIGN PATENT DOCUMENTS

JP    2007-259629 A    10/2007
JP    2011-010432 A    1/2011
(Continued)

OTHER PUBLICATIONS

Japanese Office Action mailing date of Oct. 18, 2016 in the corresponding JP application No. 2016-508327. (English translation attached).
(Continued)

Primary Examiner — Rina Duda
(74) Attorney, Agent, or Firm — Posz Law Group, PLC

(57) ABSTRACT

A motor drive control device includes a three-phase rectifier; a boosting circuit including a reactor, a switching element, and a backflow preventing element and boosts a direct-current bus voltage supplied from the three-phase rectifier; a smoothing capacitor; an inverter circuit; a boosting control unit; an inverter control unit; and a circuit protecting unit suppresses a ripple current flowing through the smoothing capacitor. In the circuit protecting unit, a correlation of an on-duty ratio of the switching element included in the boosting circuit, the output power of the inverter circuit, and an estimated ripple current are set. On the basis of the on-duty ratio of the switching element, output power of the
(Continued)

inverter circuit, and the correlation, the circuit protecting unit determines an estimated ripple current flowing through the smoothing capacitor. When the estimated ripple current exceeds a preset threshold, the circuit protecting unit suppresses the ripple current.

7 Claims, 9 Drawing Sheets

(51) Int. Cl.

| | | |
|---|---|---|
| *H02P 27/08* | (2006.01) | |
| *H02M 1/14* | (2006.01) | |
| *H02M 7/537* | (2006.01) | |
| *F25B 49/02* | (2006.01) | |
| *H02P 6/14* | (2016.01) | |
| *H02M 1/00* | (2006.01) | |

(52) U.S. Cl.
CPC .............. *H02M 7/537* (2013.01); *H02P 6/14* (2013.01); *H02P 27/08* (2013.01); *F25B 2500/07* (2013.01); *F25B 2600/0253* (2013.01); *F25B 2600/111* (2013.01); *F25B 2600/112* (2013.01); *F25B 2700/151* (2013.01); *H02M 2001/007* (2013.01)

(58) Field of Classification Search
USPC .......................... 318/629, 727, 798, 800, 801
See application file for complete search history.

(56) References Cited

U.S. PATENT DOCUMENTS

| 7,898,829 B2* | 3/2011 | Oguchi .................. H02M 7/08 |
| | | 363/44 |
| 2011/0132899 A1* | 6/2011 | Shimomugi ........ H02M 3/1584 |
| | | 219/620 |

FOREIGN PATENT DOCUMENTS

| JP | 2011-061900 A | 3/2011 |
| JP | 2011-109869 A | 6/2011 |
| JP | 2012-196142 A | 10/2012 |
| JP | 2012-231672 A | 11/2012 |
| JP | 2013-066299 A | 4/2013 |
| JP | 2013-207925 A | 10/2013 |
| JP | 2013-219985 A | 10/2013 |

OTHER PUBLICATIONS

International Search Report of the International Searching Authority mailed Jun. 3, 2014 for the corresponding international application No. PCT/JP2014/057015 (and English translation).

* cited by examiner

MOTOR DRIVE CONTROL DEVICE, COMPRESSOR, AIR-SENDING DEVICE, AND AIR-CONDITIONING APPARATUS

CROSS REFERENCE TO RELATED APPLICATION

This application is a U.S. national stage application of PCT/JP2014/057015 filed on Mar. 15, 2014, the contents of which are incorporated herein by reference.

TECHNICAL FIELD

The present invention relates to a motor drive control device, a compressor, an air-sending device, and an air-conditioning apparatus.

BACKGROUND ART

Conventional motor drive control devices include one that is configured to generate a direct-current bus voltage for driving an inverter from an alternating-current power supply, such as a commercial power supply. Such a motor drive control device is used, for example, as a drive source for driving a motor of a compressor of an air-conditioning apparatus.

When the motor drive control device is used as a drive source for driving a motor of a compressor of an air-conditioning apparatus, the motor is often designed, for the purpose of improving energy consumption efficiency during rated operation, so that an induced voltage (counter electromotive force) and a power supply voltage are substantially the same at around a rated rotation speed.

For example, in an overload operation where the motor is operated at a rotation speed exceeding its rated rotation speed, the output current is increased by saturation of the output voltage of an inverter circuit. As a result, in the overload operation different from the rated operation, the operation efficiency of the motor or the inverter circuit is decreased.

To reduce the decrease in the operation efficiency during the overload operation, a motor drive control device including a boosting circuit is proposed (see, for example, Patent Literature 1).

The boosting circuit is disposed between a rectifying circuit and an inverter circuit, and includes a reactor, a backflow preventing diode, and a switching element. A direct-current bus voltage rectified by the rectifying circuit is boosted by the boosting circuit. The boosting circuit accumulates energy in the reactor while the switching element is on. While the switching element is off, the boosting circuit releases the energy accumulated in the reactor, thus boosting the direct-current bus voltage.

The boosting operation performed by the boosting circuit to boost the direct-current bus voltage is controlled by a time period during which the switching element is on, that is, by the on-duty ratio of the switching element. Because the boosting operation performed by the boosting circuit to boost the direct-current bus voltage increases a voltage applied to the motor, a current flowing through the motor is suppressed. Thus, the conventional motor drive control device improves the operation efficiency by suppressing the current flowing through the motor as a result of the boosting operation of the boosting circuit, and increases the operating range by increasing the voltage applied to the motor.

In the conventional motor drive control device, when the boosting circuit performs a boosting operation, driving the switching element causes a circuit loss. Thus, in the conventional motor drive control device, when the boosting circuit performs a boosting operation, the circuit loss of the switching element may cause decrease in operation efficiency. Thus, the conventional motor drive control device restricts the boosting operation of the boosting circuit within the operating range where the voltage needs to be boosted.

Conventional motor drive control devices also include one that is configured to detect the pulsation amplitude ($\Delta V$) of the direct-current bus voltage and perform, if the detected pulsation amplitude exceeds a preset value, protective control for suppressing the output power of an inverter, thereby suppressing a ripple current flowing through a smoothing capacitor (see, for example, Patent Literature 2).

CITATION LIST

Patent Literature

Patent Literature 1: Japanese Unexamined Patent Application Publication No, 2012-196142 (paragraphs [0012] to [0059] and FIGS. 1 to 16)

Patent Literature 2: Japanese Unexamined Patent Application Publication No. 2007-259629 (paragraph [0012] and FIG. 2)

SUMMARY OF INVENTION

Technical Problem

The motor drive control device described in Patent Literature 1 controls the direct-current bus voltage to keep it constant at a preset target value. The same applies to the case when the power supply voltage drops. For example, the motor drive control device described in Patent Literature 1 controls the direct-current bus voltage to a target value by increasing the time period during which the switching element of the boosting circuit is on, that is, by increasing the on-duty ratio.

Generally, a smoothing capacitor is connected to an output direct-current bus voltage portion of the boosting circuit for smoothing the voltage. That is, the smoothing capacitor is connected between the boosting circuit and the inverter circuit. In the circuit configuration, the smoothing capacitor needs to be placed close to a heat-generating component, such as a power module, included in the inverter circuit. Hence, the ambient temperature of the smoothing capacitor is high.

When the boosting circuit is in operation, if the power supply voltage drops and the inverter output voltage is large, a ripple current flowing into the smoothing capacitor increases, thereby generating heat in the smoothing capacitor and a wiring portion around the smoothing capacitor. The heat generation may shorten the lives of various components mounted on the circuit board, and may even damage the components at worst.

To reduce deterioration of various components caused by heat generation, it is necessary to increase the capacitance of the smoothing capacitor or select highly heat-resistant components as the smoothing capacitor and components around the smoothing capacitor. However, such a measure increases the cost of the circuit board.

When the boosting circuit is in operation, the motor drive control device described in Patent Literature 2 cannot detect the pulsating voltage of the direct-current bus voltage because the direct-current bus voltage is constant. Thus, because the motor drive control device described in Patent Literature 2 does not detect the pulsation amplitude (ΔV) of the direct-current bus voltage, the protective control function that suppresses the output power of the inverter is not performed. Thus, when the boosting circuit is in operation, the motor drive control device described in Patent Literature 2 cannot suppress a ripple current flowing through the smoothing capacitor.

That is, when the boosting circuit is in operation, conventional motor drive control devices, such as those described in Patent Literatures 1 and 2, may be unable to suppress a ripple current flowing through the smoothing capacitor.

The present invention has been made to solve the problems described above. An object of the present invention is to provide a motor drive control device that can suppress a ripple current flowing through a smoothing capacitor even when a boosting circuit is in operation, and also to provide a compressor, an air-sending device, and an air-conditioning apparatus.

Solution to Problem

A motor drive control device according to the present invention includes a rectifier configured to rectify an alternating-current voltage supplied from an alternating-current power supply; a boosting circuit including a reactor, a switching element, and a backflow preventing element and configured to boost a direct-current bus voltage supplied from the rectifier; a smoothing capacitor configured to smooth an output of the boosting circuit; an inverter circuit configured to convert the direct-current bus voltage smoothed by the smoothing capacitor into an alternating-current voltage and output the alternating-current voltage to a motor; a boosting control unit configured to control an operation of the boosting circuit; an inverter control unit configured to control an operation of the inverter circuit; and a circuit protecting unit configured to suppress a ripple current flowing through the smoothing capacitor. In the circuit protecting unit, a correlation of an on-duty ratio of the switching element included in the boosting circuit, output power of the inverter circuit, and an estimated ripple current that is an estimate of the ripple current flowing through the smoothing capacitor are set. On the basis of the on-duty ratio of the switching element, the output power of the inverter circuit, and the correlation, the circuit protecting unit is configured to determine an estimated ripple current that is an estimate of the ripple current flowing through the smoothing capacitor. When the estimated ripple current exceeds a preset threshold, the circuit protecting unit is configured to suppress the ripple current flowing through the smoothing capacitor.

Advantageous Effects of Invention

According to the present invention, even when the boosting circuit is in operation, a ripple current flowing through the smoothing capacitor can be suppressed by performing control appropriate to the estimated ripple current. Thus, the present invention has advantageous effects of ensuring high reliability.

DESCRIPTION OF EMBODIMENTS

Embodiments 1 and 2 of the present invention will be described below in detail with reference to the drawings. Note that steps describing a program that performs the operation of each of Embodiments 1 and 2 of the present invention are taken sequentially in the order of description, but do not necessarily need to be taken sequentially. That is, some of the steps may be taken concurrently or individually.

Each of functions described in Embodiments 1 and 2 may be implemented either by hardware or software. That is, each of block diagrams described in Embodiments 1 and 2 may be regarded either as a block diagram of hardware or as a functional block diagram of software. For example, each block diagram may be implemented by hardware, such as a circuit device, or may be implemented by software executed on a computing device, such as a processor (not shown).

The blocks in block diagrams described in Embodiments 1 and 2 may be configured in any suitable way as long as their functions are performed, and the configuration of each of Embodiments 1 and 2 does not necessarily need to be divided into blocks. Embodiments 1 and 2 are the same unless otherwise specified, and the same functions and components will be described using the same reference signs. Embodiments 1 and 2 may be performed either individually or in combination. In either case, advantageous effects described below can be achieved. A set of various settings described in Embodiments 1 and 2 is merely an example, and the present invention is not particularly limited to the set of various settings.

Although the following description deals with an example where a motor drive control device 1 drives a motor 81 used for a compressor 71 of an air-conditioning apparatus, the motor drive control device 1 may drive the motor 81 used for other devices.

The configuration and operation of the motor drive control device 1 described below are merely examples and are not particularly limited thereto. The description and detailed illustration of the detailed structure and operation of the motor drive control device 1 will be simplified or omitted as appropriate. Also, redundant or similar description will be simplified or omitted as appropriate.

Embodiment 1

A configuration, operation, and advantageous effects of the motor drive control device 1 according to Embodiment 1 of the present invention will be described below in sequence with reference to the drawings.

(Configuration of Motor Drive Control Device 1)

Figure 1:
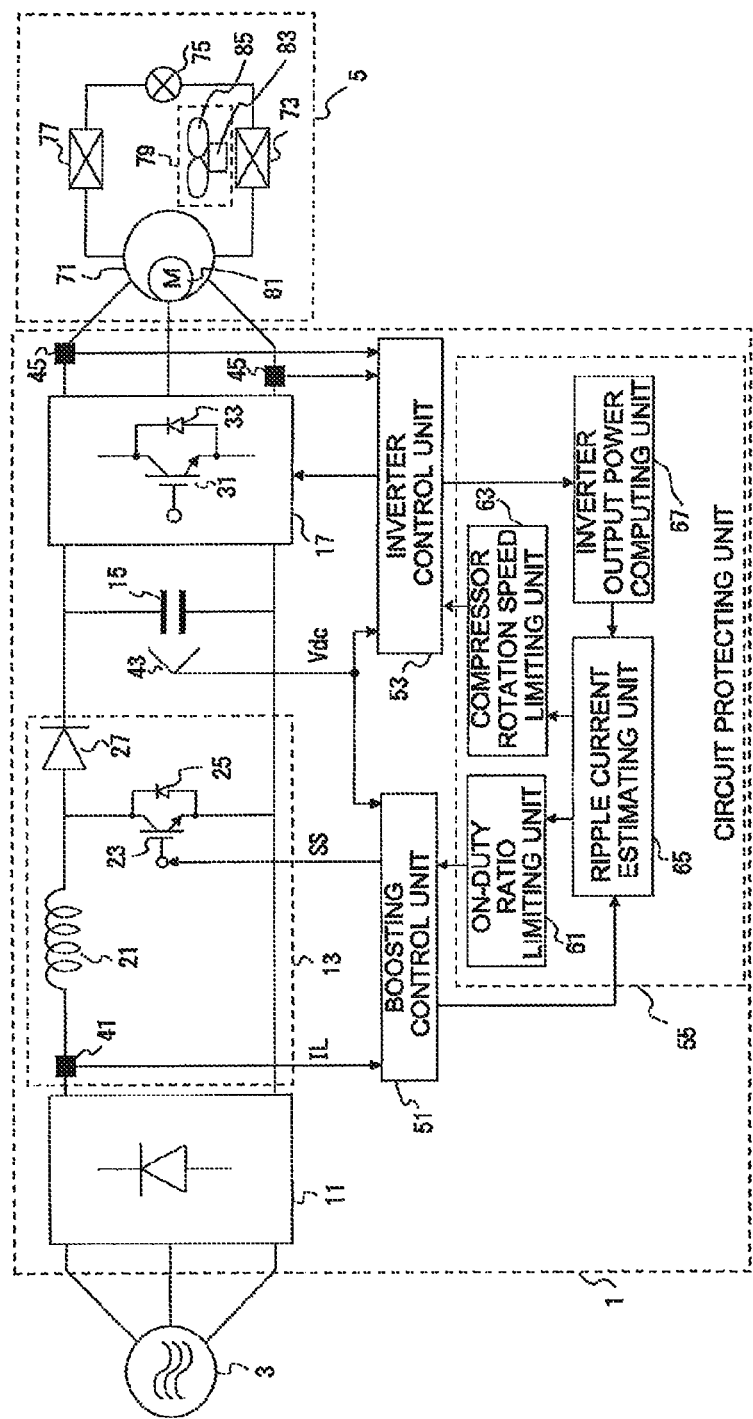
FIG. 1 illustrates a general configuration of a motor drive control device 1 according to Embodiment 1 of the present invention, and a general configuration of a refrigerant circuit 5 including a compressor 71 driven by the motor drive control device 1.

A configuration of the motor drive control device 1 according to Embodiment 1 of the present invention will be described. FIG. 1 illustrates a general configuration of the motor drive control device 1 according to Embodiment 1 of the present invention, and a general configuration of a refrigerant circuit 5 including the compressor 71 driven by the motor drive control device 1. As illustrated in FIG. 1, the motor drive control device 1 is disposed between a three-phase alternating-current power supply 3 and the refrigerant circuit 5. The motor drive control device 1 converts power supplied from the three-phase alternating-current power supply 3, and supplies the resulting power to the motor 81, such as a load M, of the compressor 71 in the refrigerant circuit 5. The motor drive control device 1 and the refrigerant circuit 5 form an air-conditioning apparatus. The refrigerant circuit 5 includes the compressor 71, a condenser 73, an expansion device 75, and an evaporator 77 connected to each other by refrigerant pipes to allow a refrigerant to circulate therethrough, thereby forming a refrigeration cycle.

The motor drive control device 1 includes a three-phase rectifier 11, a boosting circuit 13, a smoothing capacitor 15, and an inverter circuit 17. The three-phase rectifier 11 converts an alternating-current voltage of the three-phase alternating-current power supply 3, such as AC 200 V, to a direct-current bus voltage Vdc. For example, the three-phase rectifier 11 is a three-phase full-wave rectifier formed by six diodes bridge-connected to each other.

The boosting circuit 13 is a circuit configured to boost the direct-current bus voltage Vdc supplied from the three-phase rectifier 11 to, for example, DC 350 V. The boosting circuit 13 is, for example, a boosting chopper circuit formed by a reactor 21, a switching element 23, and a backflow preventing element 27. A commutating diode 33 is connected in parallel to the switching element 23. The operation of the boosting circuit 13 will be described below in detail.

The smoothing capacitor 15 is configured to smooth and charge the output of the boosting circuit 13. To suppress a surge voltage, the smoothing capacitor 15 is typically placed close to the boosting circuit 13 and a power module forming the inverter circuit 17.

The inverter circuit 17 converts the direct-current power charged by the smoothing capacitor 15 to alternating-current power, such as a pulse width modulation (PWM) voltage.

The inverter circuit 17 is formed, for example, by a snubber capacitor (not shown), a shunt resistor (not shown), and a power module. The power module is formed by a plurality of switching elements 31. A commutating diode 33 is connected in parallel to each of the switching elements 31. For example, the switching elements 31 are each formed by an insulated gate bipolar transistor (IGBT).

The inverter circuit 17 has the input side connected to the smoothing capacitor 15, and the output side connected to the motor 81 of the compressor 71. Thus, the inverter circuit 17 outputs an alternating current of a preset frequency to the motor 81 of the compressor 71 to drive the rotation of the motor 81.

The motor drive control device 1 includes a reactor current detector 41, a direct-current bus voltage detector 43, and motor current detectors 45. The reactor current detector 41 is disposed between the three-phase rectifier 11 and the reactor 21, and configured to detect a reactor current IL flowing through the reactor 21. The reactor current detector 41 is formed, for example, by a shunt resistor, but is not particularly limited to the shunt resistor.

The direct-current bus voltage detector 43 is configured to detect the direct-current bus voltage Vdc that is the output voltage of the boosting circuit 13 by measuring the voltage across the smoothing capacitor 15. The motor current detectors 45 are disposed between the output side of the inverter circuit 17 and the compressor 71, and each configured to detect a current output from the inverter circuit 17 to the motor 81 of the compressor 71.

The motor drive control device 1 includes a boosting control unit 51, an inverter control unit 53, and a circuit protecting unit 55. The boosting control unit 51 is configured to control the operation of the boosting circuit 13 by supplying a switching signal SS to the switching element 23 on the basis of the detection result from the reactor current detector 41 and the detection result from the direct-current bus voltage detector 43.

The boosting control unit 51 is configured to limit the amount of control over the boosting circuit 13 in accordance with a command from the circuit protecting unit 55. Limiting the amount of control over the boosting circuit 13 does not mean setting an upper limit on the amount of control over the boosting circuit 13, but it means reducing the current amount of control over the boosting circuit 13.

The inverter control unit 53 is configured to control the operation of the inverter circuit 17 on the basis of the detection result from the direct-current bus voltage detector 43 and the detection result from the motor current detectors 45. The inverter control unit 53 limits the amount of control over the inverter circuit 17 in accordance with a command from the circuit protecting unit 55.

The circuit protecting unit 55 is configured to suppress a ripple current flowing through the smoothing capacitor 15. The circuit protecting unit 55 includes, for example, a ripple current estimating unit 65 and an inverter output power computing unit 67. The inverter output power computing unit 67 is configured to compute the output power of the inverter circuit 17. The ripple current estimating unit 65 is configured to determine an estimated ripple current that is an estimate of ripple current flowing through the smoothing capacitor 15.

When the circuit protecting unit 55 includes an on-duty ratio limiting unit 61 and a compressor rotation speed limiting unit 63, the circuit protecting unit 55 suppresses a ripple current in the smoothing capacitor 15 by controlling at least one of the boosting circuit 13 and the inverter circuit 17 appropriate to the estimated ripple current determined by the ripple current estimating unit 65.

When the boosting circuit 13 operates and the estimated ripple current exceeds a preset threshold, the on-duty ratio limiting unit 61 limits the on-duty ratio of the switching element 23 to suppress the ripple current flowing through the smoothing capacitor 15.

When the boosting circuit 13 operates and the estimated ripple current exceeds a preset threshold, the compressor rotation speed limiting unit 63 limits the rotation speed of the compressor 71 to suppress the ripple current flowing through the smoothing capacitor 15.

The boosting control unit 51, the inverter control unit 53, the on-duty ratio limiting unit 61, the compressor rotation speed limiting unit 63, the ripple current estimating unit 65, and the inverter output power computing unit 67 may be formed by executing a program module in accordance with a command from a CPU, such as a microprocessor.

The boosting control unit 51, the inverter control unit 53, the on-duty ratio limiting unit 61, the compressor rotation speed limiting unit 63, the ripple current estimating unit 65, and the inverter output power computing unit 67 are shown separately, merely for convenience of explanation. These units may have any configuration, as long as their functions are implemented. For example, the boosting control unit 51, the inverter control unit 53, the on-duty ratio limiting unit 61, the compressor rotation speed limiting unit 63, the ripple current estimating unit 65, and the inverter output power computing unit 67 may be formed by their supersets or subsets that execute the corresponding functions.

The boosting control unit 51, the inverter control unit 53, the on-duty ratio limiting unit 61, the compressor rotation speed limiting unit 63, the ripple current estimating unit 65, and the inverter output power computing unit 67 may be implemented by a wired logic circuit.

The inverter control unit 53 will be described below in detail. The inverter control unit 53 is configured to PWM-control the inverter circuit 17 on the basis of the direct-current bus voltage Vdc detected by the direct-current bus voltage detector 43 and a motor current detected by the motor current detectors 45. For example, the inverter control unit 53 controls the rotation speed of the compressor 71 to achieve an expected refrigeration capacity.

Specifically, the inverter control unit 53 controls the rotation speed of the compressor 71 by adjusting the frequency of the output voltage of the inverter circuit 17, and determines the output frequency of the inverter circuit 17 from the product of the number of pole pairs of the motor 81 of the compressor 71 and the rotation speed of the compressor 71.

The inverter control unit 53 needs to allow a current corresponding to the load torque of the motor 81 determined on the basis of, for example, pressure conditions of the refrigerant circuit 5 to flow through the motor 81. Thus, the inverter control unit 53 computes a voltage command value on the basis of information about the motor current detected by the motor current detectors 45. Next, on the basis of the computed voltage command value and the direct-current bus voltage Vdc detected by the direct-current bus voltage detector 43, the inverter control unit 53 determines a modulation factor K using the following equation (1). On the basis of the modulation factor K, the inverter control unit 53 determines the time period during which each of the switching elements 31 of the inverter circuit 17 is on, and generates a PWM signal,

[Equation 1]

$$(\text{Modulation factor } K) = \sqrt{2} \times \frac{(\text{Voltage command value})}{(\text{Direct-current bus voltage } Vdc)} \quad (1)$$

The voltage command value is substantially proportional to the rotation speed of the motor 81 of the compressor 71. Thus, the inverter control unit 53 performs control to increase the voltage command value as a set rotation speed of the motor 81 of the compressor 71 increases.

For example, a silicon (Si) element is used as a material for the switching element 23, the backflow preventing element 27, and the commutating diode 33, but the material is not particularly limited to a silicon (Si) element. For example, a wide-bandgap semiconductor may be used as a material for the switching element 23, the backflow preventing element 27, and the commutating diode 33. The wide-bandgap semiconductor has a band gap greater than that of the silicon (Si) element. The wide-bandgap semiconductor is a semiconductor formed, for example, by a silicon carbide (SiC) element, a gallium nitride (GaN) element, or a diamond element.

The switching element 23 may be formed by a semiconductor element, such as a metal-oxide-semiconductor field-effect transistor (MOSFET) and an IGBT. The backflow preventing element 27 may be formed by a semiconductor element, such as a fast recovery diode.

Using a wide-bandgap semiconductor as an element of the boosting circuit 13 can improve voltage resistance and increase an allowable current density. It is thus possible to achieve more compactness and higher efficiency. The wide-bandgap semiconductor may be used as one of the switching element 23, the backflow preventing element 27, and the commutating diode 33, instead of all of them.

Similarly to the switching element 23, the switching elements 31 may be formed by a wide-bandgap semiconductor, such as a silicon carbide (SiC) element.

Figure 2:
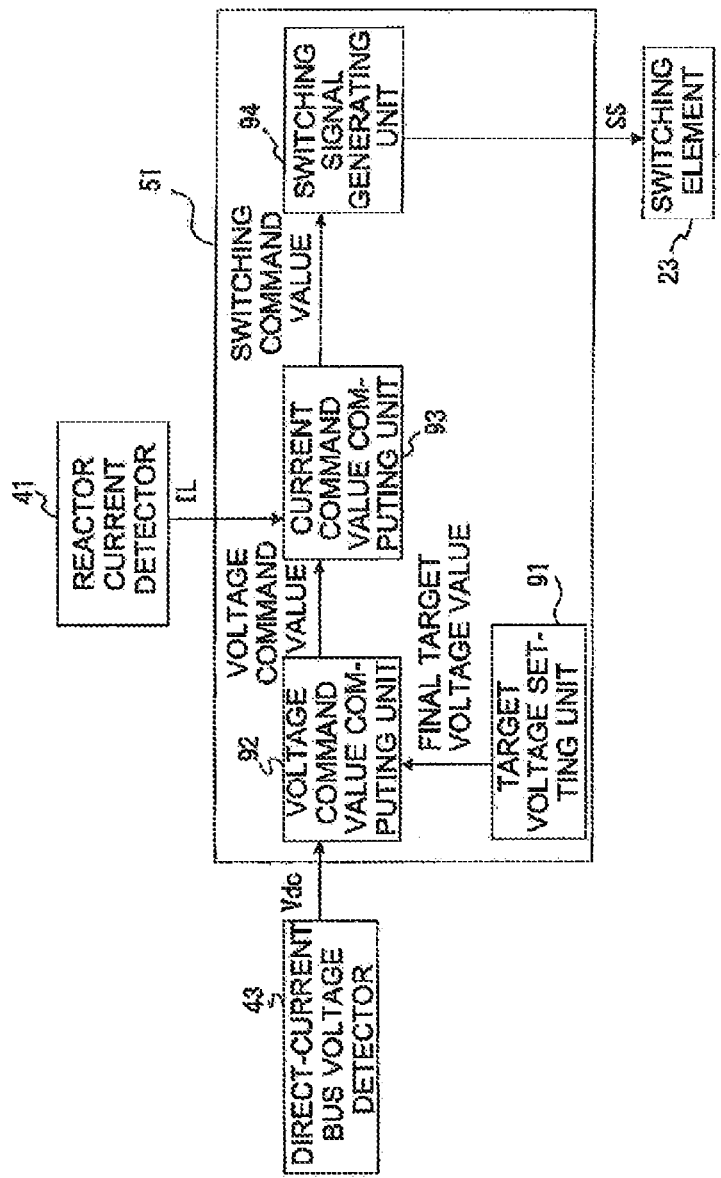
FIG. 2 illustrates a general configuration of a boosting control unit 51 included in the motor drive control device 1 according to Embodiment 1 of the present invention.

Next, the boosting control unit 51 will be described in detail. FIG. 2 illustrates a general configuration of the boosting control unit 51 included in the motor drive control device 1 according to Embodiment 1 of the present invention. As illustrated in FIG. 2, the boosting control unit 51 includes a target voltage setting unit 91, a voltage command value computing unit 92, a current command value computing unit 93, and a switching signal generating unit 94.

The target voltage setting unit 91 is configured to store a preset target voltage value assumed to correspond to the direct-current bus voltage Vdc. For example, the target voltage setting unit 91 may set and store target voltage values corresponding to respective direct-current bus voltages Vdc. The target voltage setting unit 91 may set and store a correlation between the direct-current bus voltage Vdc and the target voltage value. The target voltage setting unit 91 supplies the stored target voltage value, as a final target voltage value, to the voltage command value computing unit 92.

As described above, the direct-current bus voltage Vdc is supplied from the boosting circuit 13 in boosting operation. The direct-current bus voltage detector 43 detects the direct-current bus voltage Vdc supplied from the boosting circuit 13, and supplies the detection result to the voltage command value computing unit 92.

The voltage command value computing unit 92 is configured to compute a voltage command value on the basis of the final target voltage value supplied from the target voltage setting unit 91 and the direct-current bus voltage Vdc supplied from the direct-current bus voltage detector 43. For example, the voltage command value computing unit 92 may compute a voltage command value using proportional integral (PI) control. The voltage command value computing unit 92 supplies the computed voltage command value to the current command value computing unit 93.

The current command value computing unit 93 is configured to compute a switching command value on the basis of the voltage command value computed by the voltage command value computing unit 92 and the reactor current IL detected by the reactor current detector 41. For example, the current command value computing unit 93 may compute a switching command value using proportional integral derivative (PID) control. The current command value computing unit 93 supplies the computed switching command value to the switching signal generating unit 94.

The switching signal generating unit 94 is configured to generate the switching signal SS on the basis of the switching command value supplied from the current command value computing unit 93. The switching signal SS is a drive pulse, such as a PWM command, for driving the switching element 23. For example, the switching signal SS is generated in the following manner. First, the switching signal generating unit 94 applies the switching command value to a carrier wave, such as a triangular wave, of a preset frequency. Next, the switching signal generating unit 94 converts the periods where the triangular wave is greater than the switching command value into the on-state. Next, the switching signal generating unit 94 converts the periods where the triangular wave is smaller than the switching command value into the off-state. The switching signal SS is thus generated.

The operation of the boosting circuit 13 will be described below. First, an alternating-current voltage is supplied from the three-phase alternating-current power supply 3 to the three-phase rectifier 11. Next, the three-phase rectifier 11 rectifies the alternating-current voltage supplied from the three-phase alternating-current power supply 3 to a direct-current voltage, and supplies the rectified direct-current voltage to the boosting circuit 13. When the boosting circuit 13 is in boosting operation, the boosting circuit 13 boosts the direct-current voltage rectified by the three-phase rectifier 11.

Specifically, when the switching element 23 turns on, the backflow preventing element 27 is brought out of conduction, and the voltage rectified by the three-phase rectifier 11 is applied to the reactor 21. On the other hand, when the switching element 23 turns off, the backflow preventing element 27 is brought into conduction, and a voltage directed opposite to that of the case where the switching element 23 turns on is induced into the reactor 21.

That is, when the switching element 23 turns on, energy is accumulated in the reactor 21, whereas when the switching element 23 turns off, the accumulated energy is transferred to the inverter circuit 17, which is a load. The direct-current bus voltage Vdc of the boosting circuit 13 is controlled by controlling the on-duty ratio of the switching element 23.

When the boosting circuit 13 is not in boosting operation, the switching element 23 does not turn on, and hence energy is not accumulated in the reactor 21. Thus, the boosting circuit 13 does not boost the direct-current voltage rectified by the three-phase rectifier 11.

A ripple current flowing through the smoothing capacitor 15 will be described below. When the boosting circuit 13 is not in operation, the direct-current voltage rectified by the three-phase rectifier 11 is applied to the smoothing capacitor 15. When inverter output power is small or substantially zero, a constant direct-current bus voltage Vdc is applied to the smoothing capacitor 15 by the action of the smoothing capacitor 15. On the other hand, when inverter output power is large, a voltage with large pulsation is applied to the smoothing capacitor 15 because of generation of a pulsating voltage caused by the frequency of the alternating-current voltage supplied from the three-phase alternating-current power supply 3. That is, a current obtained by the following equation (2) flows through the smoothing capacitor 15.

[Equation 2]

$$Ripple current = C \times \frac{dV}{dt} \quad (2)$$

In equation (2), C is the capacitance of a capacitor such as the smoothing capacitor 15, and V is a voltage applied across the capacitor, such as the smoothing capacitor 15. Thus, because dV/dt is the time derivative of the voltage across the capacitor, such as the smoothing capacitor 15, which is the slope of voltage change, equation (2) indicates that a current that allows the voltage applied to the capacitor, such as the smoothing capacitor 15, to be kept constant flows through the capacitor, such as the smoothing capacitor 15.

As described above, as the inverter output power increases, the pulsation of the voltage applied to the smoothing capacitor 15 also increases. Generally, the frequency component of the pulsating voltage is mainly six times the frequency of the three-phase alternating-current power supply 3. When the line voltages of the three-phase alternating-current power supply 3 become imbalanced, a pulsating voltage with a frequency component that is double the frequency of the three-phase alternating-current power supply 3 is superimposed on the pulsating voltage with the frequency component six times the frequency of the three-phase alternating-current power supply 3. As the degree of imbalance between the line voltages of the three-phase alternating-current power supply 3 and the inverter output power increase, the frequency component that is double the frequency of the three-phase alternating-current power supply 3 increases, and hence an excessive ripple current flows through the smoothing capacitor 15.

Heat generation of a capacitor, such as the smoothing capacitor 15, is proportional to the square of the effective value of a current flowing through the capacitor. Thus, if a ripple current exceeding an allowable value for the smoothing capacitor 15 flows, the smoothing capacitor 15 generates an abnormal amount of heat. The heat may shorten the capacitor life, and may even damage the smoothing capacitor 15 at worst.

As a solution, there is a device that computes the pulsation amplitude of the direct-current bus voltage Vdc from a peak-to-peak voltage difference on the basis of the voltage across the smoothing capacitor 15, which is the voltage value detected by the direct-current bus voltage detector 43, and suppresses the inverter output power if the computed pulsation amplitude exceeds a preset value, thereby limiting the pulsation amplitude within the preset value range to enhance the protection of the smoothing capacitor 15.

When the boosting circuit 13 is in operation, the switching element 23 is PWM-controlled to make the direct-current bus voltage Vdc constant. Thus, no voltage pulsation is caused by the frequency of the three-phase alternating-current power supply 3, and the direct-current bus voltage Vdc becomes constant. However, a ripple current caused by the switching frequency of the switching element 23 flows through the smoothing capacitor 15.

As a result, protective control on the basis of the detected pulsation amplitude is not performed. Thus, in the device that performs protective control by comparing the pulsation amplitude with the preset value, no protection is given to the smoothing capacitor 15 even if a ripple current exceeding an allowable value for the smoothing capacitor 15 flows through the smoothing capacitor 15.

Figure 3:
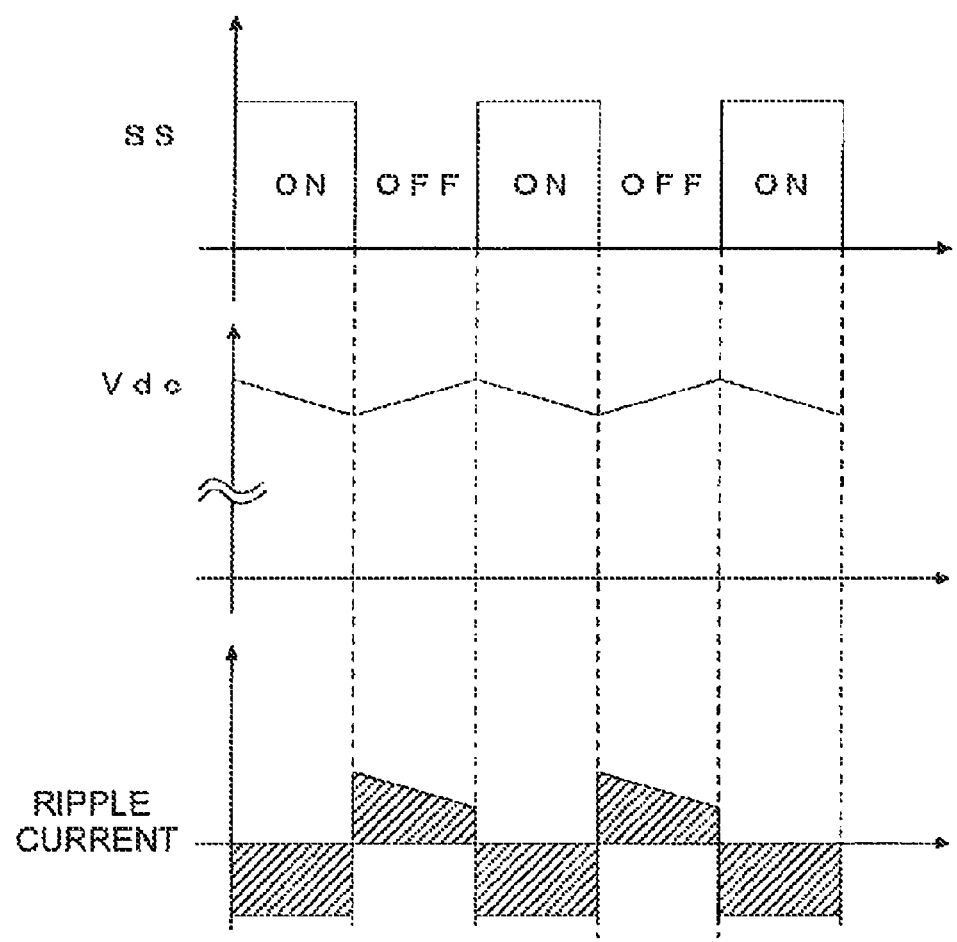
FIG. 3 illustrates a ripple current flowing through a smoothing capacitor 15 included in the motor drive control device 1 according to Embodiment 1 of the present invention when the motor drive control device 1 is in boosting operation.
Figure 4:
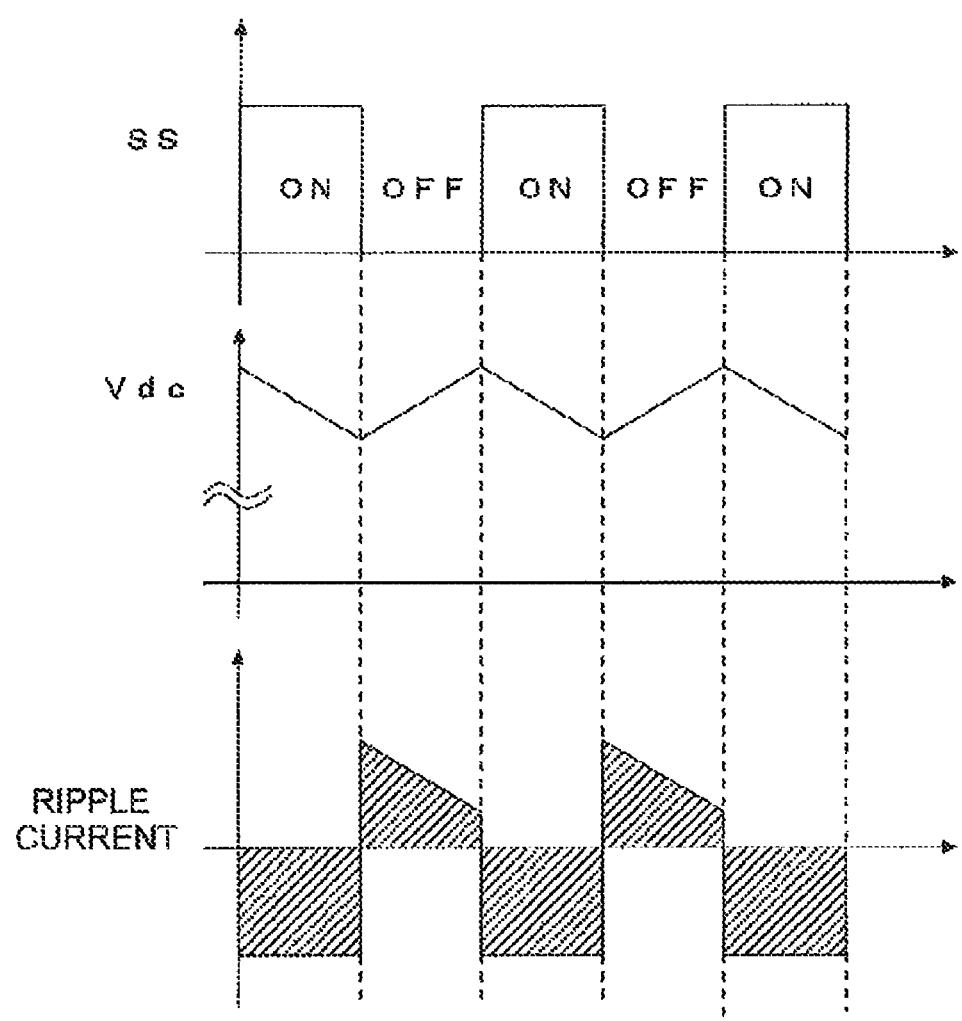
FIG. 4 illustrates a ripple current flowing through the smoothing capacitor 15 when the motor drive control device 1 according to Embodiment 1 of the present invention is in boosting operation and also the inverter output power of an inverter circuit 17 is large.
Figure 5:
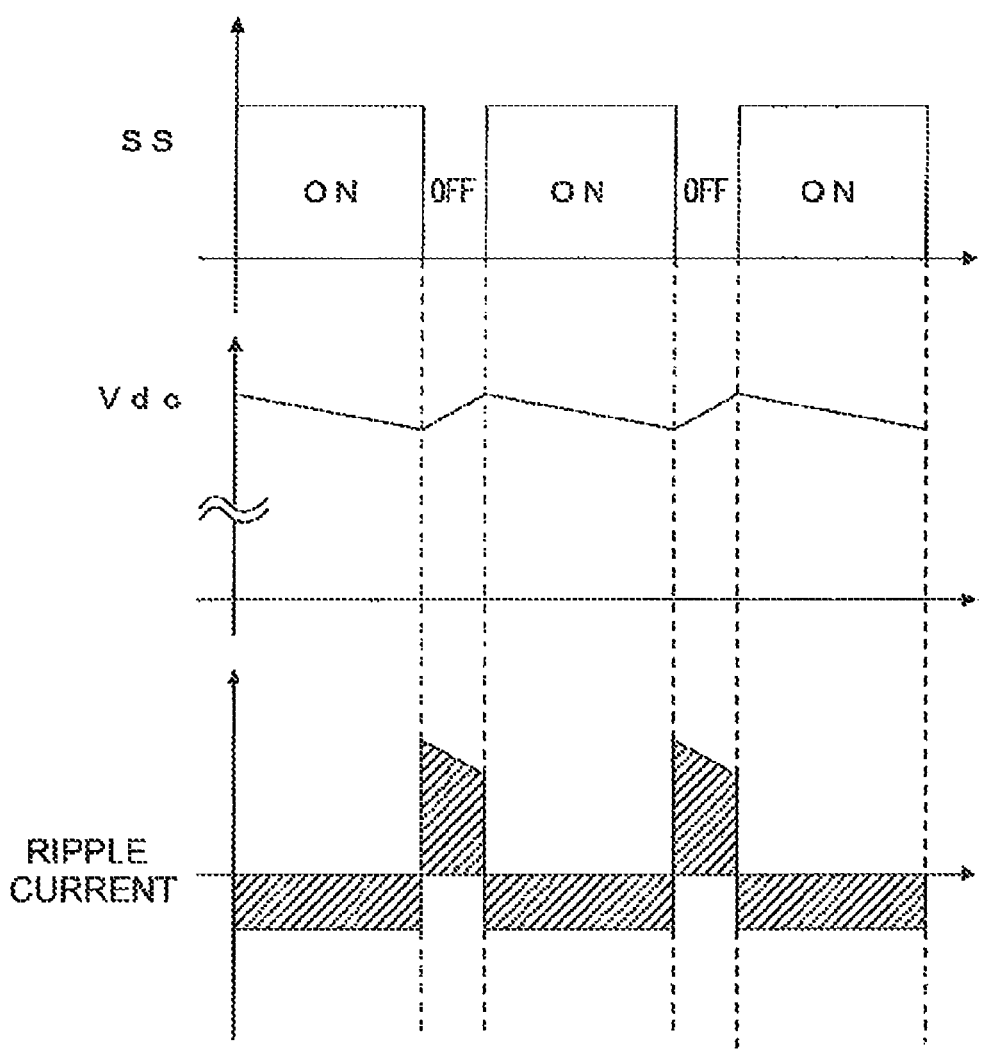
FIG. 5 illustrates a ripple current flowing through the smoothing capacitor 15 when the motor drive control device 1 according to Embodiment 1 of the present invention is in boosting operation and also the on-duty ratio of a switching element 23 is large.

A ripple current that flows through the smoothing capacitor 15 when the boosting circuit 13 is in operation will be described with reference to FIGS. 3 to 5, from the view point of the correlation of the ripple current, the switching signal SS, and the direct-current bus voltage Vdc. FIG. 3 illustrates a ripple current flowing through the smoothing capacitor 15 included in the motor drive control device 1 according to Embodiment 1 of the present invention when the motor drive control device 1 is in boosting operation. FIG. 4 illustrates a ripple current flowing through the smoothing capacitor 15 when the motor drive control device 1 according to Embodiment 1 of the present invention is in boosting operation and also the inverter output power of the inverter circuit 17 is large. FIG. 5 illustrates a ripple current flowing through the smoothing capacitor 15 when the motor drive control device 1 according to Embodiment 1 of the present invention is in boosting operation and also the on-duty ratio of the switching element 23 is large.

First, an operation performed when the switching element 23 is on will be described. In the period during which the switching element 23 is on, because no charging path is connected to the smoothing capacitor 15, the output power of the smoothing capacitor 15 is supplied to the inverter circuit 17. During this period, the direct-current bus voltage Vdc decreases with a substantially constant slope. Thus, as can be seen from equation (2), a substantially constant ripple current flows through the smoothing capacitor 15 in the negative direction if the direction of current flowing into the smoothing capacitor 15 is considered positive and the direction of current flowing out of the smoothing capacitor 15 is considered negative.

Next, an operation performed when the switching element 23 is off will be described. In the period during which the switching element 23 is off, because a charging path is connected to the smoothing capacitor 15, energy accumulated in the reactor 21 is transferred to the smoothing capacitor 15 and the inverter circuit 17, thereby boosting the direct-current bus voltage Vdc. Thus, a ripple current flows through the smoothing capacitor 15 in the inflow direction, which is the positive direction.

A main frequency component of the ripple current flowing when the boosting circuit 13 is in operation is the switching frequency of the switching element 23. A component contributing to heat generation of the smoothing capacitor 15 is the effective value of the ripple current. The amount of heat generated by the smoothing capacitor 15 is proportional to shaded areas in FIG. 3, that is, to the amount of ripple current flowing through the smoothing capacitor 15. That is, the amount of heat generated by the smoothing capacitor 15 is proportional to the time integral of ripple current.

As illustrated in FIG. 4, when the inverter output power of the inverter circuit 17 is large, the amount of charge into or out of the smoothing capacitor 15 is also large, and hence the amount of change in the direct-current bus voltage Vdc, which is the slope of the direct-current bus voltage Vdc, is large. Thus, the amount of ripple current flowing through the smoothing capacitor 15, that is, the area defined by the ripple current and the time axis, that is, the time integral of the ripple current, increases and hence the amount of heat generated by the smoothing capacitor 15 increases.

FIG. 5 illustrates an example in which the amount of boosting of the boosting circuit 13 increases. When the amount of boosting of the boosting circuit 13 increases, that is, when the output voltage of the three-phase rectifier 11 drops, the on-duty ratio of the switching element 23 increases to keep the direct-current bus voltage Vdc at a target voltage. Thus, the amount of energy accumulated in the reactor 21 increases. Thus, even when the voltage of the three-phase alternating-current power supply 3 drops, the direct-current bus voltage Vdc can be boosted to the target voltage. During this period, as can be seen in FIG. 5, a ripple current flowing through the smoothing capacitor 15 has the amount of change in direct-current bus voltage Vdc larger than that in the normal boosting operation shown in FIG. 3. Thus, the amount of ripple current flowing through the smoothing capacitor 15, that is, the area defined by the ripple current and the time axis, increases and hence the amount of heat generated by the smoothing capacitor 15 increases.

That is, as the amount of change in direct-current bus voltage Vdc increases, the time integral of the ripple current increases, and hence the amount of heat generated by the smoothing capacitor 15 increases.

As described above, when the amount of ripple current flowing through the smoothing capacitor 15 increases, the temperatures of a wiring portion connected to the smoothing capacitor 15 and a pattern formed on the printed circuit board increase, and the temperatures of various components placed around the smoothing capacitor 15 also increase. Generally, the smoothing capacitor 15 is often disposed close to the boosting circuit 13 and a heat-generating component, such as a power module, included in the inverter circuit 17, the temperature of the smoothing capacitor 15 increases more significantly.

In Embodiment 1, a ripple current flowing through the smoothing capacitor 15 is suppressed even when the boosting circuit 13 is in operation. Thus, even when the boosting circuit 13 is in operation, an increase in ripple current flowing through the smoothing capacitor 15 is detected and the smoothing capacitor 15 and various components placed around the smoothing capacitor 15 are protected in the manner described below.

(Operation of Motor Drive Control Device 1)

Figure 6:
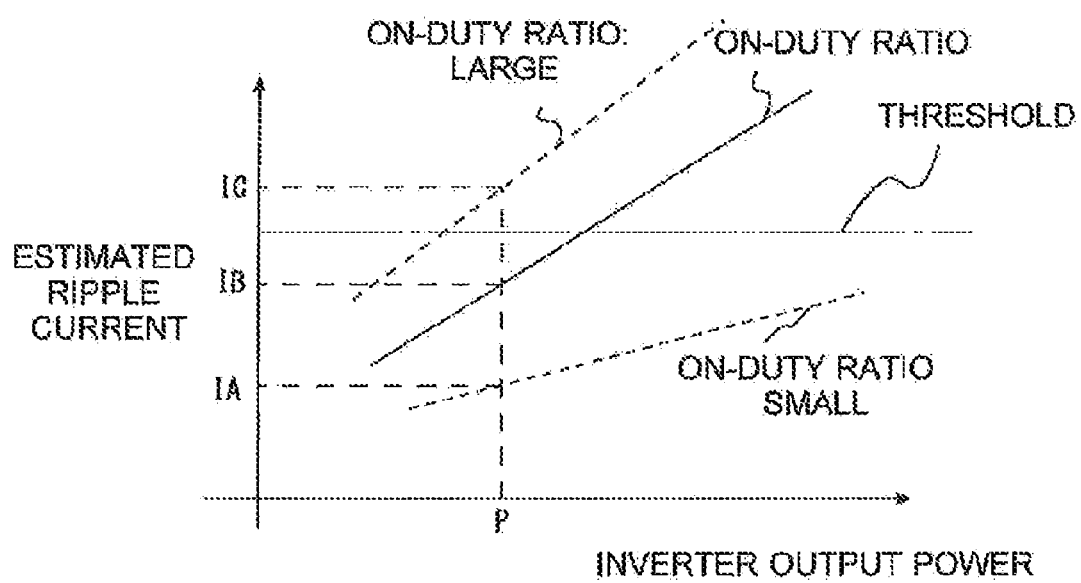
FIG. 6 shows a correlation of the inverter output power of the inverter circuit 17, the on-duty ratio of the switching element 23, and the estimated ripple current that is an estimate of ripple current flowing through the smoothing capacitor 15, according to Embodiment 1 of the present invention.

The operation of the motor drive control device 1 according to Embodiment 1 of the present invention will be described. FIG. 6 shows a correlation of the inverter output power of the inverter circuit 17, the on-duty ratio of the switching element 23, and the estimated ripple current that is an estimate of ripple current flowing through the smoothing capacitor 15, according to Embodiment 1 of the present invention.

As described above, the amount of displacement of ripple current flowing through the smoothing capacitor 15 depends on the inverter output power and the on-duty ratio of the switching element 23, and thus the correlation shown in FIG. 6 is established. For example, although the ripple current increases as the inverter output power increases, the magnitude of the ripple current varies depending on the on-duty ratio of the switching element 23.

For example, when the on-duty ratio of the switching element 23 is large, the amount of increase in ripple current corresponding to the inverter output power is large. Conversely, when the on-duty ratio of the switching element 23 is small, the amount of increase in ripple current corresponding to the inverter output power is small.

For example, as shown in FIG. 6, even when the same inverter output power is provided, the estimated ripple current is not large when the on-duty ratio of the switching element 23 is small, whereas the estimated ripple current is large when the on-duty ratio of the switching element 23 is large. The estimated ripple current may or may not exceed a preset threshold, depending on the on-duty ratio.

The correlation described above can be determined, for example, by a previous test of an actual machine or by a simulation. That is, any technique may be used as long as the correlation of the ripple current flowing through the smoothing capacitor 15, the on-duty ratio of the switching element 23, and the inverter output power of the inverter circuit 17 can be determined, and then a threshold for the ripple current can be determined on the basis of the determined correlation. The method for determining the threshold for the ripple current is not limited to a specific method. For example, as described above, the amount of heat generated by the smoothing capacitor 15 is proportional to the square of the ripple current flowing through the smoothing capacitor 15. Thus, the threshold for the ripple current may be set so that an increase in the temperature of the smoothing capacitor 15 does not exceed the allowable temperature values for various components.

Various components around the smoothing capacitor 15 are affected by heat generated by the smoothing capacitor 15. The wiring portion through which ripple current flows is also affected by heat generated by the smoothing capacitor 15. Thus, the threshold for the ripple current may be determined on the basis of the allowable temperatures for the various components around the smoothing capacitor 15 and the allowable value for the wiring portion through which ripple current flows.

The on-duty ratio of the switching element 23 may be determined from a result of computation by the boosting control unit 51. The inverter output power may be determined from a result of computation by the inverter output power computing unit 67. Specifically, the inverter output power computing unit 67 determines the inverter output power using the following equation (3) on the basis of a detection value of the motor current detectors 45, an inverter voltage command value computed by the inverter control unit 53, and a power factor determined from a phase difference θ between the detection value of the motor current detectors 45 and the inverter voltage command value.

[Equation 3]

$$\text{Inverter output } P = \sqrt{3} \times V \times I \times \cos\theta \quad (3)$$

In equation (3), P is the inverter output power, V is the inverter voltage command value computed by the inverter control unit 53, I is the effective value of a current I flowing through the motor 81 and detected by the motor current detectors 45, and cos θ is the power factor calculated from the phase difference θ between the voltage command value V and the effective value of the current I flowing through the motor 81.

The ripple current flowing through the smoothing capacitor 15 depends on the total power of loads connected to the smoothing capacitor 15. Thus; for example, when power is supplied from the smoothing capacitor 15 to the inverter circuit 17 for driving an air-sending device 79 of the air-conditioning apparatus; the ripple current flowing through the smoothing capacitor 15 can be estimated further accurately by calculating the output power of the inverter circuit 17 using equation (3) and making a summation. In the absence of the inverter circuit 17, power consumption may be computed from such information as voltage values and current values.

Next, a method for estimating the ripple current flowing through the smoothing capacitor 15, depending on whether the boosting circuit 13 is in operation, will be described. In the range where the boosting circuit 13 is not in operation, the ripple current is only required to be estimated from the pulsation amplitude of the direct-current bus voltage Vdc as described above. On the other hand, in the range where the boosting circuit 13 is in operation, the ripple current is only required to be estimated on the basis of a correlation, such as that shown in FIG. 6. The ripple current corresponding to the entire operating range of the compressor 71 can thus be estimated.

Next, an operation performed when the estimated ripple current exceeds a preset threshold will be described. As can be seen from FIG. 6, the ways of suppressing the ripple current flowing through the smoothing capacitor 15 include reducing the inverter output power and reducing the on-duty ratio of the switching element 23, and one or both of them are only required to be performed.

First, an operation performed by the compressor rotation speed limiting unit 63 to reduce the inverter output power will be described. As a way of reducing the inverter output power, the compressor rotation speed limiting unit 63 limits the rotation speed of the compressor 71.

An inverter command voltage is substantially proportional to the rotation speed of the compressor 71. Thus, as can be seen from equation (3), by reducing the rotation speed of the compressor 71 to lower the inverter command voltage, the compressor rotation speed limiting unit 63 can suppress the inverter output power as a result. The compressor rotation speed limiting unit 63 can thus suppress a ripple current flowing through the smoothing capacitor 15, and protect the smoothing capacitor 15, various components around the smoothing capacitor 15, and the wiring portion of the smoothing capacitor 15.

Specifically, to ensure stability of the air-conditioning apparatus, for example, the compressor rotation speed limiting unit 63 reduces the rotation speed of the compressor 71 by a few percent every few seconds, thereby performing control to reduce the rotation speed of the compressor 71 until the estimated ripple current falls within a preset threshold range. To stabilize the rotation speed of the compressor 71 at around the preset threshold for the estimated ripple current, a hysteresis region corresponding to the preset threshold for the estimated ripple current may be provided.

Next, an operation performed by the on-duty ratio limiting unit 61 to reduce the on-duty ratio of the switching element 23 will be described. As a way of reducing the on-duty ratio of the switching element 23, the on-duty ratio limiting unit 61 limits the on-duty ratio of the switching element 23.

Specifically, when the output voltage of the three-phase rectifier 11, which is the voltage value of the three-phase alternating-current power supply 3, drops, the boosting control unit 51 performs control to increase the on-duty ratio to keep the direct-current bus voltage Vdc at a target voltage. However, if the estimated ripple current exceeds a preset threshold, the boosting control unit 51 limits the on-duty ratio of the switching element 23, in response to a command from the on-duty ratio limiting unit 61, to reduce the amount of boosting. That is, the on-duty ratio limiting unit 61 can suppress the amount of ripple current by lowering the direct-current bus voltage Vdc.

To ensure stability of control, a hysteresis region corresponding to the preset threshold for the estimated ripple current may be provided. Note that limiting the on-duty ratio does not refer to restricting the upper limit of the on-duty ratio, but refers to reducing the current on-duty ratio.

The on-duty ratio computed by the boosting control unit 51 is a value that varies in each control period of, for example, a microcomputer. Using this value with no change may cause hunting in control. An on-duty ratio used for the ripple current estimating unit 65 is only required to be a value obtained by filtering the on-duty ratio computed by the boosting control unit 51, and by setting the time constant to a large value to improve the stability of control. For example, the time constant may be set to a few seconds.

A process appropriate to the modulation factor K of the inverter circuit 17 will be described below. In the range where the modulation factor K of the inverter circuit 17 is less than one, the effective value of the inverter output power does not change even when the direct-current bus voltage Vdc drops. Thus, the motor drive control device 1 can suppress the ripple current without reducing the inverter output power, that is, without affecting the capability of the air-conditioning apparatus.

On the other hand, in the range where the modulation factor K of the inverter circuit 17 is greater than or equal to one, or in the case where limiting the on-duty ratio reduces the direct-current bus voltage Vdc and thus increases the modulation factor K of the inverter circuit 17 to one or more, the inverter output power is reduced by the drop of the direct-current bus voltage Vdc. In this case, when a load, such as the compressor 71, is connected, the inverter control unit 53 increases the motor current, in response to the drop of the inverter output power, to make the inverter output power constant.

Figure 7:
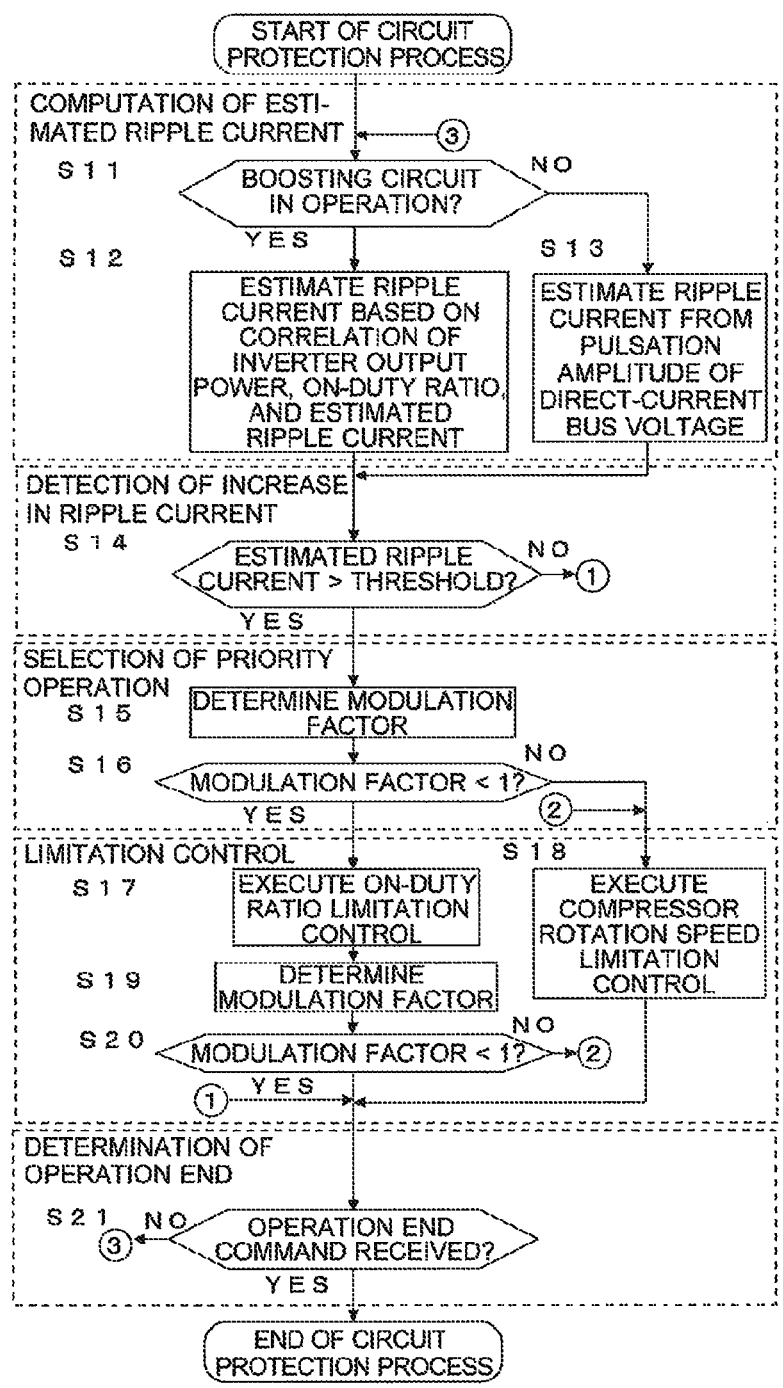
FIG. 7 is a flowchart illustrating a current suppressing control process of the motor drive control device 1 according to Embodiment 1 of the present invention.

FIG. 7 is a flowchart illustrating a current suppressing control process of the motor drive control device 1 according to Embodiment 1 of the present invention. The operation performed in steps S11 to S13 is computation of an estimated ripple current. The operation performed in step S14 is detection of an increase in ripple current. The operation performed in steps S15 and S16 is selection of a priority operation. The operation performed in steps S17 to S20 is limitation control. The operation performed in step S21 is determination of operation end.

(Computation of Estimated Ripple Current)
(Step S11)
The motor drive control device 1 determines whether the boosting circuit 13 is in operation. If the boosting circuit 13 is in operation, the motor drive control device 1 proceeds to step S12. If the boosting circuit 13 is not in operation, the motor drive control device 1 proceeds to step S13.
(Step S12)
The motor drive control device 1 estimates a ripple current on the basis of the correlation of inverter output power, on-duty ratio, and estimated ripple current.
(Step S13)
The motor drive control device 1 estimates a ripple current from the pulsation amplitude of the direct-current bus voltage Vdc.
(Detection of Increase in Ripple Current)
(Step S14)
The motor drive control device 1 determines whether the estimated ripple current exceeds a threshold. If the estimated ripple current exceeds the threshold, the motor drive control device 1 proceeds to step S15. If the estimated ripple current does not exceed the threshold, the motor drive control device 1 proceeds to step S21. As described above, the threshold refers to a preset threshold, such as that shown in FIG. 6.
(Selection of Priority Operation)
(Step S15)
The motor drive control device 1 determines the modulation factor K.
(Step S16)
The motor drive control device 1 determines whether the modulation factor K is less than one. If the modulation factor K is less than one, the motor drive control device 1 proceeds to step S17. On the other hand, if the modulation factor K is greater than or equal to one, the motor drive control device 1 proceeds to step S18.
(Limitation Control)
(Step S17)
The motor drive control device 1 executes on-duty ratio limitation control.
(Step S18)
The motor drive control device 1 executes compressor rotation speed limitation control.
(Step S19)
The motor drive control device 1 determines the modulation factor K.
(Step S20)
The motor drive control device 1 determines whether the modulation factor K is less than one. If the modulation factor K is less than one, the motor drive control device 1 proceeds to step S21. If the modulation factor K is greater than or equal to one, the motor drive control device 1 proceeds to step S18.
(Determination of Operation End)
(Step S21)
The motor drive control device 1 determines whether an operation end command has been received. If the operation end command has been received, the motor drive control device 1 ends the process. If no operation end command has been received, the motor drive control device 1 returns to step S11.

(Advantageous Effects of Motor Drive Control Device 1)
Generally, to prevent an overcurrent from flowing through the motor 81, if the motor current exceeds a preset threshold, such as a value determined by the level of demagnetization, the inverter control unit 53 reduces the rotation speed of the compressor 71 to suppress the motor current. When the on-duty ratio limiting unit 61 operates to reduce the inverter output power, the inverter control unit 53 increases the motor current to a level exceeding a value determined, for example, by the level of demagnetization. Thus, similarly to the compressor rotation speed limiting unit 63, the inverter control unit 53 reduces the rotation speed of the compressor 71. As a result, as in the case of the operation of the compressor rotation speed limiting unit 63 described above, the inverter control unit 53 can protect the smoothing capacitor 15, various components around the smoothing capacitor 15, and the wiring portion of the smoothing capacitor 15.

Thus, even when only one of the compressor rotation speed limiting unit 63 and the on-duty ratio limiting unit 61 performs its control operation, the ripple current flowing through the smoothing capacitor 15 is reduced. Protection against demagnetization in response to an increase in current may be given priority, so that only the compressor rotation speed limiting unit 63 operates and the operation of the on-duty ratio limiting unit 61 is stopped.

Generally, losses in the power module included in the inverter circuit 17 include a switching loss that occurs when the switching elements 31 in the inverter circuit 17 is switched, and a conduction loss that occurs when the switching elements 31 is on. For example, when a current flowing through the motor 81 increases, a loss in the switching elements 31, particularly a conduction loss, increases. Thus, for example, if the smoothing capacitor 15 is disposed close to the power module, the temperature of the smoothing capacitor 15 increases more significantly, because the smoothing capacitor 15 is affected by heat generated by the power module.

To reduce the amount of heat received by the smoothing capacitor 15 from the power module, the on-duty ratio limiting unit 61 gives priority to the operation of the compressor rotation speed limiting unit 63 if the estimated ripple current exceeds the preset threshold and the modulation factor K is in the range greater than or equal to one. As a result, an increase in the conduction loss of the power module is prevented. Thus, the amount of heat received by the smoothing capacitor 15 from the power module can be reduced.

Losses in various elements included in the boosting circuit 13, such as the switching element 23 and the backflow preventing element 27, also include a switching loss and a conduction loss. However, when the compressor rotation speed limiting unit 63 starts to operate, the inverter output power is reduced and hence, a current flowing through the switching element 23 and the backflow preventing element 27 is also reduced. As a result, losses in the boosting circuit 13 are reduced, and thus the motor drive control device 1 can reduce an influence of heat on the smoothing capacitor 15.

On the other hand, if the estimated ripple current exceeds the preset threshold and the modulation factor K is in the range less than one, the motor drive control device 1 gives priority to the operation of the on-duty ratio limiting unit 61. As a result, as described above, the motor drive control device 1 can reduce an increase in the temperature of the smoothing capacitor 15 without decreasing the capability of the air-conditioning apparatus.

When the direct-current bus voltage Vdc is reduced and the modulation factor K is increased to one or more by operating the on-duty ratio limiting unit 61, to prevent an increase in current flowing through the motor 81 of the compressor 71, the motor drive control device 1 may perform control for switching from the on-duty ratio limiting unit 61 to the compressor rotation speed limiting unit 63, so that a ripple current falls within a preset threshold range.

As can be seen from the foregoing description, even when the boosting circuit 13 is in operation, the motor drive control device 1 detects an increase in ripple current flowing through the smoothing capacitor 15. Also, if the estimated ripple current exceeds the preset threshold, the motor drive control device 1 controls the on-duty ratio of the boosting circuit 13, the rotation speed of the compressor 71, and other related factors so that the estimated ripple current falls within the preset threshold range. Thus, the motor drive control device 1 reduces heat generation caused by the ripple current flowing through the smoothing capacitor 15, and can ensure high reliability.

Specifically, even when the boosting circuit 13 is in operation, the motor drive control device 1 can estimate the ripple current flowing through the smoothing capacitor 15 on the basis of the on-duty ratio of the boosting circuit 13 and the inverter output power of the inverter circuit 17. Then, if the estimated ripple current exceeds the preset threshold, the motor drive control device 1 operates to limit at least one of the inverter output power of the inverter circuit 17 and the amount of boosting of the boosting circuit 13. Thus, the motor drive control device 1 can ensure high reliability while preventing heat generation of various components without cost increase.

More specifically, the motor drive control device 1 estimates the ripple current flowing through the smoothing capacitor 15 on the basis of the inverter output power of the inverter circuit 17 and the on-duty ratio of the switching element 23 in the boosting circuit 13, and if the estimated ripple current exceeds the preset threshold, the motor drive control device 1 determines, appropriately to the modulation factor K of the inverter circuit 17, the priority for execution given to which one of the operation of the compressor rotation speed limiting unit 63 and the operation of the on-duty ratio limiting unit 61. As a result, without significantly affecting the capability of the air-conditioning apparatus, the motor drive control device 1 can protect the smoothing capacitor 15, various components around the smoothing capacitor 15, and the wiring portion of the smoothing capacitor 15 from heat. The motor drive control device 1 can thus contribute to providing a highly reliable air-conditioning apparatus. The operation of the motor drive control device 1 is equivalent to lowering the heat-resistance temperature of the smoothing capacitor 15 and selecting a low-capacitance capacitor as the smoothing capacitor 15, and thus a cost reduction can be achieved.

In other words, even when the boosting circuit 13 is in operation, the motor drive control device 1 can suppress the ripple current flowing through the smoothing capacitor 15 by performing control appropriate to the estimated ripple current. The motor drive control device 1 can thus ensure high reliability.

In Embodiment 1, the motor drive control device 1 includes the three-phase rectifier 11 configured to rectify an alternating-current voltage supplied from the three-phase alternating-current power supply 3; the boosting circuit 13 including the reactor 21, the switching element 23, and the backflow preventing element 27 and configured to boost a direct-current bus voltage supplied from the three-phase rectifier 11; the smoothing capacitor 15 configured to smooth the output of the boosting circuit 13; the inverter circuit 17 configured to convert the direct-current bus voltage smoothed by the smoothing capacitor 15 into an alternating-current voltage and output it to the motor 81; the boosting control unit 51 configured to control the operation of the boosting circuit 13; the inverter control unit 53 configured to control the operation of the inverter circuit 17; and the circuit protecting unit 55 configured to suppress a ripple current flowing through the smoothing capacitor 15. In the circuit protecting unit 55, a correlation of the on-duty ratio of the switching element 23 included in the boosting circuit 13, the output power of the inverter circuit 17, and an estimated ripple current that is an estimate of the ripple current flowing through the smoothing capacitor 15 are set. On the basis of the on-duty ratio of the switching element 23, the output power of the inverter circuit 17, and the correlation, the circuit protecting unit 55 is configured to determine an estimated ripple current that is an estimate of the ripple current flowing through the smoothing capacitor 15. Then, when the estimated ripple current exceeds a preset threshold, the circuit protecting unit 55 is configured to suppress the ripple current flowing through the smoothing capacitor 15.

With his configuration, even when the boosting circuit 13 is in operation, the motor drive control device 1 can suppress the ripple current flowing through the smoothing capacitor 15 by performing control appropriate to the estimated ripple current. The motor drive control device 1 can thus ensure high reliability.

In Embodiment 1, the circuit protecting unit 55 may include the inverter output power computing unit 67 configured to compute output power, and the ripple current estimating unit 65 configured to determine an estimated ripple current on the basis of the output power computed by the inverter output power computing unit 67 and the on-duty ratio of the switching element 23 determined by the boosting control unit 51.

With this configuration, even when the boosting circuit 13 is in operation, the motor drive control device 1 can detect an increase in ripple current.

In Embodiment 1, the circuit protecting unit 55 may fu her include the on-duty ratio limiting unit 61 configured to reduce the on-duty ratio of the boosting circuit 13 to reduce the amount of boosting if the estimated ripple current determined by the ripple current estimating unit 65 exceeds the preset threshold and the modulation factor K of the inverter circuit 17 is less than one, and the compressor rotation speed limiting unit 63 configured to reduce output power if the estimated ripple current determined by the ripple current estimating unit 65 exceeds the preset threshold and the modulation factor K of the inverter circuit 17 is greater than or equal to one.

With this configuration, the motor drive control device 1 can determine, appropriately to the modulation factor K of the inverter circuit 17, the priority for execution given to which one of the operation of the on-duty ratio limiting unit 61 and the operation of the compressor rotation speed limiting unit 63.

Also in Embodiment 1, at least one of the switching element 23 and the backflow preventing element 27 is formed by a wide-bandgap semiconductor.

With this configuration, the heat resistance of the boosting circuit 13 can be improved, and hence the size of the motor drive control device 1 can be reduced.

In Embodiment 1, the wide-bandgap semiconductor is an element using a silicon carbide, an element using a gallium nitride material, or an element using a diamond.

With this configuration, the motor drive control device 1 can be formed by elements having higher heat resistance than silicon, which is a conventional semiconductor material.

Embodiment 2

(Configuration of Motor Drive Control Device 1)

The motor drive control device 1 according to Embodiment 2 will be described with reference to FIGS. 8 and 9. As described in Embodiment 1, as the inverter output power of the inverter circuit 17 increases, a ripple current flowing through the smoothing capacitor 15 increases. In Embodiment 1, the rotation speed of the compressor 71 is limited to reduce the inverter output power of the inverter circuit 17. Embodiment 2 provides a configuration including a high pressure suppressing unit 69 configured to control the pressure conditions of the air-conditioning apparatus.

Figure 8:
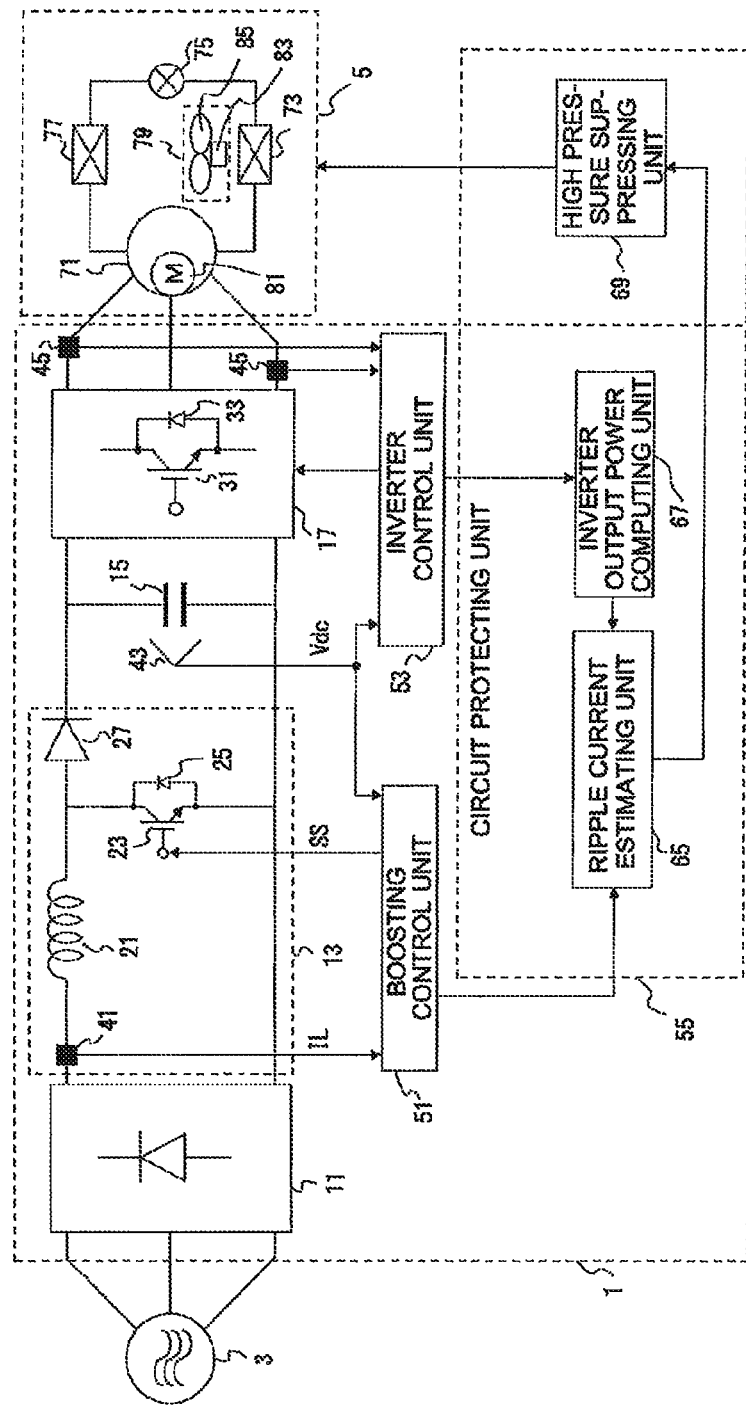
FIG. 8 illustrates a general configuration of a motor drive control device 1 according to Embodiment 2 of the present invention, and a general configuration of the refrigerant circuit 5 including the compressor 71 driven by the motor drive control device 1.

FIG. 8 illustrates a general configuration of the motor drive control device 1 according to Embodiment 2 of the present invention, and a general configuration of the refrigerant circuit 5 including the compressor 71 driven by the motor drive control device 1. As illustrated in FIG. 8, the circuit protecting unit 55 includes the ripple current estimating unit 65, the inverter output power computing unit 67, and the high pressure suppressing unit 69. The air-sending device 79 is disposed close to the condenser 73, includes a motor 83 and a fan 85, and is configured to supply air to the condenser 73. Although an example of supplying air from the air-sending device 79 to the condenser 73 will be described, the configuration is not particularly limited to this example. For example, the air-sending device 79 may be disposed close to the evaporator 77 and configured to supply air to the evaporator 77. Also, the motor drive control device 1 may be configured to drive the motor 83 of the air-sending device 79. That is, the inverter circuit 17 may drive the motor 83 of the air-sending device 79.

An operating principle of Embodiment 2 will be described below. As can be seen from equation (3) described above, the inverter output power of the inverter circuit 17 is proportional to the current I flowing through the motor 81 of the compressor 71. Generally, the magnitude of current flowing through the motor 81 is proportional to the load torque of the motor 81. When this relation is applied to the compressor 71 of the air-conditioning apparatus, the load torque is determined on the basis of the pressure conditions of the compressor 71.

For example, when the pressure of the compressor 71 is high, a large torque is required to drive the rotation of the compressor 71. On the other hand, when the pressure of the compressor 71 is low, a torque required to drive the rotation of the compressor 71 is small. That is, when the pressure of the compressor 71 is reduced, a current flowing through the motor 81 is reduced. As a result, the inverter output power of the inverter circuit 17 is also reduced.

To reduce high pressure or, specifically, discharge pressure of the compressor 71, for example, the high pressure suppressing unit 69 increases the air volume of the air-sending device 79. That is, the high pressure suppressing unit 69 increases the output frequency of the inverter circuit 17 driving the air-sending device 79, and increases the rotation speed of the fan 85 to the rotation speed for suppressing high pressure. Thus, although the inverter output power corresponding to the air-sending device 79 increases, the power consumption of the motor 81 of the compressor 71 accounting for the majority of the power consumption of the air-conditioning apparatus, that is, the inverter output power for driving the compressor 71, is reduced by reducing the high pressure. A ripple current flowing through the smoothing capacitor 15 can thus be suppressed.

As in Embodiment 1, the high pressure suppressing unit 69 may start its operation when an estimated ripple current exceeds a preset threshold.

(Operation of Motor Drive Control Device 1)

Figure 9:
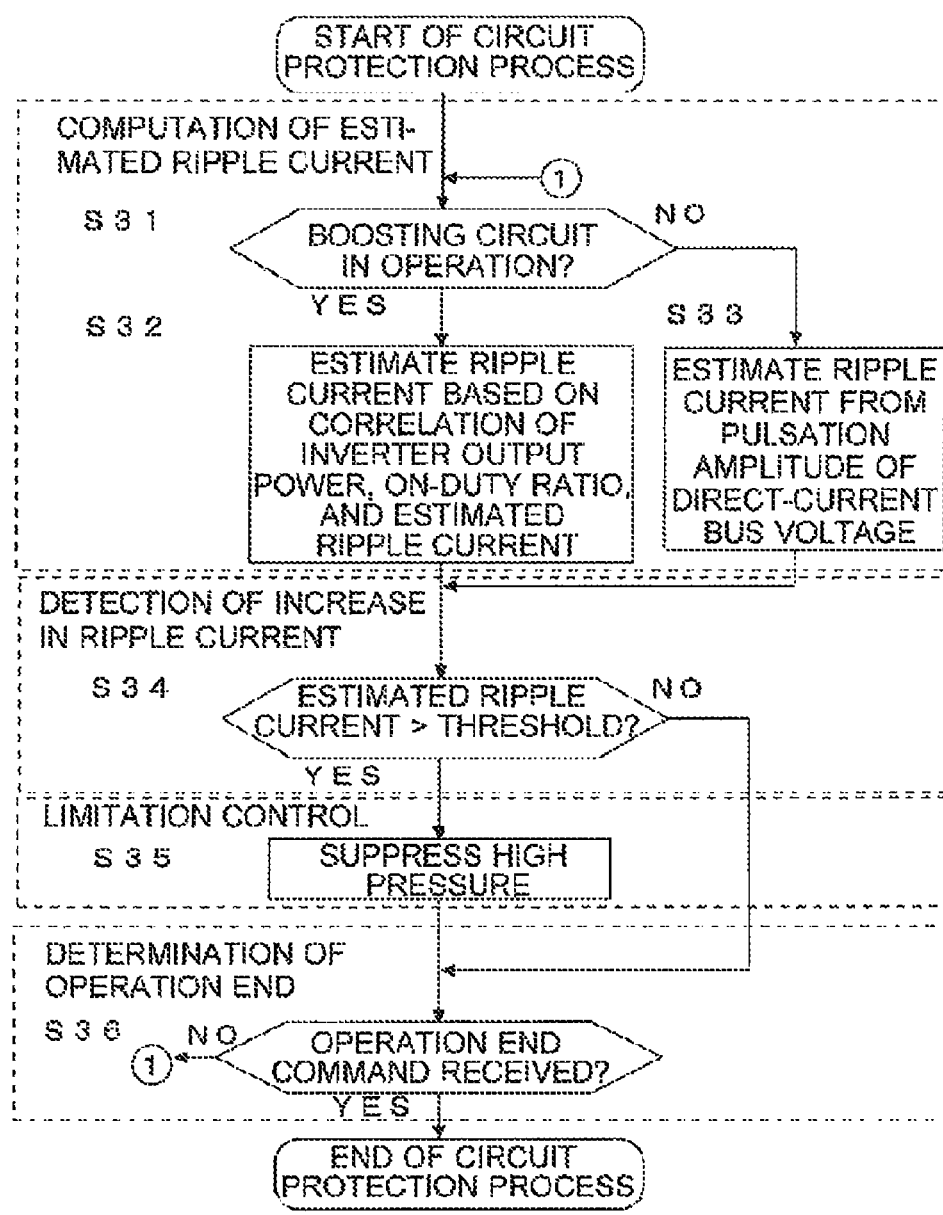
FIG. 9 is a flowchart illustrating a current suppressing control process of the motor drive control device 1 according to Embodiment 2 of the present invention.

FIG. 9 is a flowchart illustrating a current suppressing control process of the motor drive control device 1 according to Embodiment 2 of the present invention. The operation performed in steps S31 to S33 is computation of an estimated ripple current. The operation performed in step S34 is detection of an increase in ripple current. The operation performed in step S35 is limitation control. The operation performed in step S36 is determination of operation end.

(Computation of Estimated Ripple Current)

(Step S31)

The motor drive control device 1 determines whether the boosting circuit 13 is in operation. If the boosting circuit 13 is in operation, the motor drive control device 1 proceeds to step S32. If the boosting circuit 13 is not in operation, the motor drive control device 1 proceeds to step S33.

(Step S32)

The motor drive control device 1 estimates a ripple current on the basis of the correlation of inverter output power, on-duty ratio, and estimated ripple current.

(Step S33)

The motor drive control device 1 estimates a ripple current from the pulsation amplitude of the direct-current bus voltage Vdc.

(Detection of Increase in Ripple Current)

(Step S34)

The motor drive control device 1 determines whether the estimated ripple current is greater than a threshold. If the estimated ripple current is greater than the threshold, the motor drive control device 1 proceeds to step S35. If the estimated ripple current is not greater than the threshold, the motor drive control device 1 proceeds to step S36. As described above, the threshold refers to a preset threshold, such as that shown in FIG. 6.

(Limitation Control)

(Step S35)

The motor drive control device 1 suppresses high pressure. As described above, the operation of suppressing high pressure involves, for example, increasing the rotation speed of the air-sending device 79 to the rotation speed for suppressing high pressure. The motor drive control device 1 reduces the discharge pressure of the compressor 71 by increasing the current rotation speed of the air-sending device 79. Thus, the rotation speed for suppressing high pressure does not necessarily need to be a fixed value, and a rotation speed higher than the current rotation speed may be set as needed.

(Determination of Operation End)

(Step S36)

The motor drive control device 1 determines whether an operation end command has been received. If the operation end command has been received, the motor drive control device 1 ends the process. If no operation end command has been received, the motor drive control device 1 returns to step S31.

(Advantageous Effects of Motor Drive Control Device 1)

As can be seen from the foregoing description, the motor drive control device 1 can reduce the discharge pressure of the compressor 71 by using the high pressure suppressing unit 69, and thus can reduce the inverter output power for driving the compressor 71. Thus, the motor drive control device 1 can suppress a ripple current flowing through the smoothing capacitor 15. The motor drive control device 1 can thus ensure high reliability.

In the air-conditioning apparatus, for example, if driving the air-sending device 79 has the function of cooling the motor drive control device 1, the heat generation of the switching element 23 used in the boosting circuit 13 and the heat generation of the switching elements 31 used in the inverter circuit 17, that is, the heat generation of the power module, can be reduced by increasing the air volume of the air-sending device 79 through the operation of the high pressure suppressing unit 69. Thus, an increase in temperature of the smoothing capacitor 15 disposed close to the power module can also be reduced. The motor drive control device 1 can thus further enhance its protective function.

In Embodiment 2, the high pressure suppressing unit 69 increases the air volume of the air-sending device 79 as a way of controlling pressure. This configuration is merely an exemplary way of reducing pressure, and the configuration is not limited to this example. Other ways may be used to reduce high pressure.

In Embodiment 2, the motor 81 may drive the compressor 71 in the refrigerant circuit 5 including the compressor 71, the condenser 73, the expansion device 75, and the evaporator 77. The circuit protecting unit 55 may further include the high pressure suppressing unit 69 configured to increase the rotation speed of the air-sending device 79 that supplies air to the condenser 73 or evaporator 77 and reduce the discharge pressure of the compressor 71 if the estimated ripple current determined by the ripple current estimating unit 65 exceeds the preset threshold.

With this configuration, the circuit protecting unit 55 can reduce the discharge pressure of the compressor 71, and thus can reduce the inverter output power for driving the compressor 71. Thus, the circuit protecting unit 55 can suppress a ripple current flowing through the smoothing capacitor 15, and can ensure high reliability.

Also with this configuration, the high pressure suppressing unit 69 reduces high pressure to reduce the power consumption of the motor 81 of the compressor 71 accounting for the majority of the power consumption of the air-conditioning apparatus, that is, the inverter output power for driving the compressor 71. The high pressure suppressing unit 69 can thus suppress a ripple current flowing through the smoothing capacitor 15.

The inverter output power in Embodiments 1 and 2 corresponds to output power in the present invention. The compressor rotation speed limiting unit 63 in Embodiments 1 and 2 corresponds to a rotation speed limiting unit in the present invention.

REFERENCE SIGNS LIST

1: motor drive control device, 3: three-phase alternating-current power supply, 5: refrigerant circuit, 11: three-phase rectifier, 13: boosting circuit, 15: smoothing capacitor, 17: inverter circuit, 21: reactor, 23, 31: switching element, 25, 33: commutating diode, 27: backflow preventing element, 41: reactor current detector, 43: direct-current bus voltage detector, 45: motor current detector, 51: boosting control unit, 53: inverter control unit, 55: circuit protecting unit, 61: on-duty ratio limiting unit, 63: compressor rotation speed limiting unit, 65: ripple current estimating unit, 67: inverter output power computing unit, 69: high pressure suppressing unit, 71: compressor, 73: condenser, 75: expansion device, 77: evaporator, 79: air-sending device, 81, 83: motor, 85: fan, 91: target voltage setting unit, 92: voltage command value computing unit, 93: current command value computing unit, 94: switching signal generating unit

The invention claimed is:

1. A motor drive control device comprising:
   a rectifier configured to rectify an alternating-current voltage supplied from an alternating-current power supply;
   a boosting circuit including a reactor, a switching element, and a backflow preventing element and configured to boost a direct-current bus voltage supplied from the rectifier;
   a smoothing capacitor configured to smooth an output of the boosting circuit;
   an inverter circuit configured to convert the direct-current bus voltage smoothed by the smoothing capacitor into an alternating-current voltage and output the alternating-current voltage to a motor;
   a boosting control unit configured to control an operation of the boosting circuit;
   an inverter control unit configured to control an operation of the inverter circuit; and
   a circuit protecting unit configured to suppress a ripple current flowing through the smoothing capacitor,
   in the circuit protecting unit, a correlation of an on-duty ratio of the switching element included in the boosting circuit, output power of the inverter circuit, and an estimated ripple current being an estimate of the ripple current flowing through the smoothing capacitor being set, the circuit protecting unit including an inverter output power computing unit configured to compute the output power, and a ripple current estimating unit configured to determine an estimated ripple current being an estimate of the ripple current flowing through the smoothing capacitor on a basis of an on-duty ratio of the switching element determined by the boosting control unit, the output power computed by the inverter output power computing unit, and the correlation, the circuit protecting unit further including at least one of an on-duty ratio limiting unit configured to reduce the on-duty ratio of the boosting circuit to reduce an amount of boosting when the estimated ripple current determined by the ripple current estimating unit exceeds a preset threshold, and a rotation speed limiting unit configured to reduce the output power when the estimated ripple current determined by the ripple current estimating unit exceeds the threshold.

2. The motor drive control device of claim 1, wherein the on-duty ratio limiting unit is configured to reduce the on-duty ratio of the boosting circuit to reduce the amount of boosting when the estimated ripple current determined by the ripple current estimating unit exceeds the threshold and a modulation factor of the inverter circuit is less than one; and the rotation speed limiting unit is configured to reduce the output power when the estimated ripple current determined by the ripple current estimating unit exceeds the threshold and the modulation factor of the inverter circuit is greater than or equal to one.

3. The motor drive control device of claim 1, wherein at least one of the switching element and the backflow preventing element is formed by a wide-bandgap semiconductor.

4. The motor drive control device of claim 3, wherein the wide-bandgap semiconductor is an element using a silicon carbide, an element using a gallium nitride material, or an element using a diamond.

5. An air-sending device comprising:

the motor driven by the motor drive control device of claim 1; and a fan driven by the motor.

6. An air-conditioning apparatus comprising:

the motor drive control device of claim 1; and a compressor that includes the motor driven by the motor drive control device.

7. A motor drive control device comprising:

a rectifier configured to rectify an alternating-current voltage supplied from an alternating-current power supply;

a boosting circuit including a reactor, a switching element, and a backflow preventing element and configured to boost a direct-current bus voltage supplied from the rectifier;

a smoothing capacitor configured to smooth an output of the boosting circuit;

an inverter circuit configured to convert the direct-current bus voltage smoothed by the smoothing capacitor into an alternating-current voltage and output the alternating-current voltage to a motor driving a compressor in a refrigerant circuit including the compressor, a condenser, an expansion device, and an evaporator;

a boosting control unit configured to control an operation of the boosting circuit;

an inverter control unit configured to control an operation of the inverter circuit; and a circuit protecting unit configured to suppress a ripple current flowing through the smoothing capacitor, in the circuit protecting unit, a correlation of an on-duty ratio of the switching element included in the boosting circuit, output power of the inverter circuit, and an estimated ripple current being an estimate of the ripple current flowing through the smoothing capacitor being set, the circuit protecting unit including an inverter output power computing unit configured to compute the output power, a ripple current estimating unit configured to determine an estimated ripple current being an estimate of the ripple current flowing through the smoothing capacitor on a basis of an on-duty ratio of the switching element determined by the boosting control unit, the output power computed by the inverter output power computing unit, and the correlation, and a high pressure suppressing unit configured to increase a rotation speed of an air-sending device sending air to the condenser or the evaporator to reduce discharge pressure of the compressor when the estimated ripple current determined by the ripple current estimating unit exceeds a preset threshold.

* * * * *